(12) United States Patent  
Liu

(10) Patent No.: US 7,411,317 B2  
(45) Date of Patent: Aug. 12, 2008

(54) ELECTRICAL LOAD STATUS DETECTION AND CONTROL DEVICE

(75) Inventor: Daniel Liu, Taipei Hsien (TW)

(73) Assignee: Prodigit Electronics Co., Ltd., Taipei Hsien (TW)

( * ) Notice: Subject to any disclaimer, the term of this patent is extended or adjusted under 35 U.S.C. 154(b) by 143 days.

(21) Appl. No.: 11/526,645

(22) Filed: Sep. 26, 2006

(65) Prior Publication Data

US 2007/0070558 A1  Mar. 29, 2007

(30) Foreign Application Priority Data

Sep. 28, 2005   (TW) ............................... 94216770 U

(51) Int. Cl.
 B23K 11/24  (2006.01)
 H02B 1/24  (2006.01)
(52) U.S. Cl. ................... 307/112; 307/116; 307/131; 361/18
(58) Field of Classification Search ............... 307/131, 307/112, 116; 361/18
See application file for complete search history.

(56) References Cited

U.S. PATENT DOCUMENTS 5,565,714 A * 10/1996 Cunningham ............... 307/112

* cited by examiner

Primary Examiner—Michael J Sherry
Assistant Examiner—Carlos Amaya
(74) Attorney, Agent, or Firm—Rosenberg, Klein & Lee

(57) ABSTRACT

An electrical load status detection and control device includes a first power supply circuit loop with a first switch, a second power supply circuit loop with a second switch, a no-load status detection unit connected with the second power supply circuit loop for detecting the current passing through the second power supply circuit loop and thereby generating a current detection signal. A micro-controller connected with a reference current value database, the no-load status detection unit, the first switch and the second switch, which receives the current detection signal from the no-load status detection unit. The micro-controller generates a switching signal to actuate the first switch and the second switch to thereby open the first power supply circuit loop and the second power supply circuit loop when detecting the current passing through the second power supply circuit loop out of the reference current value range of the reference current value database.

9 Claims, 2 Drawing Sheets

ELECTRICAL LOAD STATUS DETECTION AND CONTROL DEVICE

FIELD OF THE INVENTION

The present invention relates to a power supply control device, and more particularly to an electrical load status detection and control device.

BACKGROUND OF THE INVENTION

Nowadays, the cost of energy generation rises higher and higher with the continuous increase of the international crude oil price. Thus, most people, governments, and environment protecting organization all over the world are advocating the policy of economizing on the use of energy. Especially, with the factors of warmer climate and denser population distribution, the total consumption of energy for both industrial and civil use has grown up day after day. Under this condition, to utilize energy in effective ways has become one of the most important problems to be solved right now.

Nevertheless, among all existed power supplying systems or devices, the phenomenon of electric leakage under the no-load situation exists almost unavoidably with the general ignorance of the public. The existence of electric leakage not only causes many meaningless waste of power but also cruelly causes many unpredictable numbers of casualties. Undoubtedly, above descriptions can be further verified by the statistics released from the official all over the world.

SUMMARY OF THE INVENTION

Among all the existing power supplying systems or devices, most of which are lacking of proper protecting device to effectively solve the problems of energy waste and safety use caused by the phenomenon of electric leakage under the no-load situation.

Accordingly, a primary object of the present invention is providing an electrical load status detection and control device. The device is provided with a no-load status detection unit, a load status detection unit, a micro-controller and at least one switch for controlling power supplying. Through the detections of the no-load status detection unit and the load status detection unit, and the verification of the controller, the device is served to control the close and open of the switch to further control whether power is supplying or not.

Additionally, a secondary object of the present invention is providing a device for automatically detecting and switching power supplying between loading status and no-load mode. The device is served to automatically interrupt the power supplying when it detects a no-load status to prevent people from electric shock.

To solve above problems, a mean in accordance with the present invention is to provide a device connects with a power supply source with a first power supply terminator and a second power supply terminator, and includes a first power supply circuit loop, a second power supply circuit loop, a no-load status detection unit, a load status detection unit, a micro-controller, a reference current value database, and a reference voltage value database.

The first power supply circuit loop and the second power supply circuit loop have a first switch and a second switch respectively. When the device is changed from connecting with an external load to removing the external load, the no-load status detection unit can detect a deviation of current to do a verifying action, in the micro-controller, with a reference current value provided by the reference current value database. If the value of the deviation of current reaches to the reference current value, the micro-controller generates a switching signal to synchronously actuate the first switch and the second switch to open situation to interrupt power supplying via the first power supply circuit loop and the second power supply circuit loop.

Contrarily, when the device is changed from without connecting any external load to connecting an external load, the load status detection unit can detect a deviation of voltage to do another verifying action, in the micro-controller, with a reference voltage value provided by the reference voltage value database. If the value of the deviation of voltage reaches to the reference voltage value, the micro-controller generates a switching signal to synchronously actuate the first switch and the second switch to close situation to supplying power via the first power supply circuit loop and the second power supply circuit loop.

Comparing with the conventional power supply control devices, through the control performance of the no-load status detection unit and the load status detection unit of the device here provided in accordance with the invention, the device not only effectively reduces the waste of power, but also further ensures the safety of electric use for the user.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The elements, circuits, devices, characteristics and the best embodiment of this invention are described with relative figures as follows.

Figure 1:
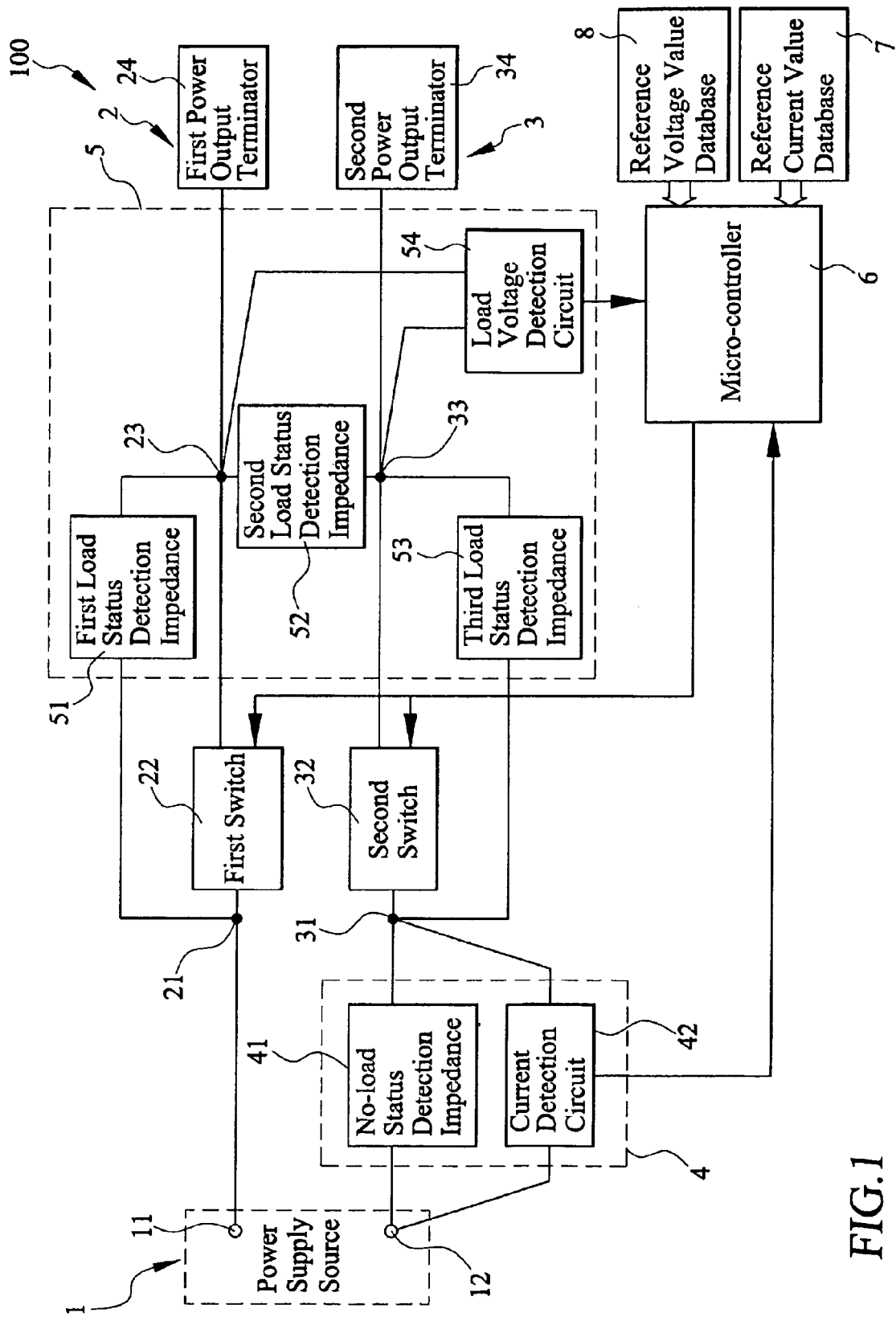
FIG. 1 is a drawing showing arrangement relation of a device in accordance with a best embodiment of the invention.

Please refer to FIG. 1, which presents arrangement relation of a device in accordance with a best embodiment of the invention. An electrical load status detection and control device 100 for automatically detecting and switching power supplying between a loading status and a no-load status is connected with a power supply source 1 and provided with a first power supply terminator 11 and a second power supply terminator 12. The electrical load status detection and control device 100 includes a first power supply circuit loop 2, a second power supply circuit loop 3, a no-load status detection unit 4, a load status detection unit 5, a micro-controller 6, a reference current value database 7, and a reference voltage value database 8.

The first power supply circuit loop 2 includes a first node 21, a first switch 22, a second node 23, and a first power output terminator 24, and sequentially connects the first power supply terminator 11, the first node 21, the first switch 22, the second node 23, and the first power output terminator 24.

The second power supply circuit loop 3 includes a third node 31, a second switch 32, a fourth node 33, and a second power output terminator 34, and sequentially connects the third node 31, the second switch 32, the fourth node 33, and the second power output terminator 34.

The no-load status detection unit 4 includes a no-load status detection impedance 41 and a current detection circuit 42. The no-load status detection impedance 41 connects with the third node 31 and the second power supply terminator 12. The current detection circuit 42 connects with the third node 31, the second power supply terminator 12, and the micro-controller 6.

The load status detection unit 5 includes a first load status detection impedance 51, a second load status detection impedance 52, a third load status detection impedance 53 and a load voltage detection circuit 54. The first load status detection impedance 51 connects with the first node 21 and the second node 23. The second load status detection impedance 52 connects with the second node 23 and the fourth node 33. The third load status detection impedance 53 connects with the third node 31 and the fourth node 33. The load voltage detection circuit 54 connects with the second node 23, the fourth node 33 and the micro-controller 6.

The micro-controller 6 connects with the current detection circuit 42 of the no-load status detection unit 4, the load voltage detection circuit 54 of the load status detection unit 5, the first switch 22, the second switch 32, the reference current value database 7 and the reference voltage value database 8.

Figure 2:
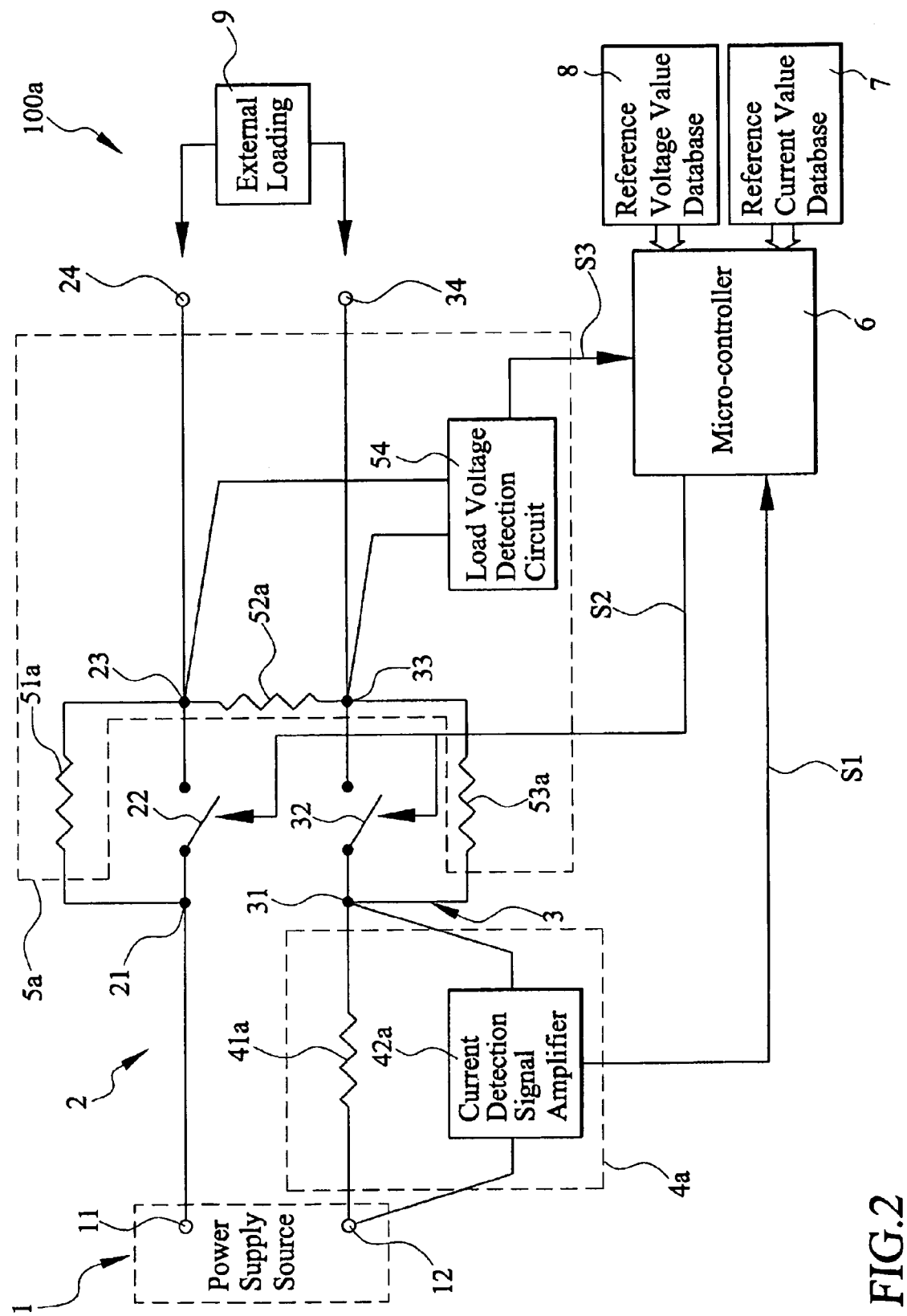
FIG. 2 is a drawing showing circuit arrangement of the device in accordance with a preferred application of the best embodiment of the invention.

Please refer to FIG. 2, showing circuit arrangement of another device in accordance with a preferred application of the best embodiment of the invention. Another electrical load status detection and control device 100a for automatically detecting and switching power supplying between a loading status and a no-load status is also connected with a power supply source 1. The difference between the electrical load status detection and control device 100 and 100a is that the no-load status detection unit 4 and the load status detection unit 5 are respectively replaced by another no-load status detection unit 4a and load status detection unit 5a.

Meanwhile, the no-load status detection impedance 41 and the current detection circuit 42 of the no-load status detection unit 4 are respectively replaced by a resistance 41a with low resistance, and a current detection signal amplifier 42a of the no-load status detection unit 4a. The first load status detection impedance 51, the second load status detection impedance 52 and the third load status detection impedance 53 of the load status detection unit 5 are replaced by three resistances 51a, 52a and 53a of the load status detection unit 5a with high resistances. Hereafter, we will provide further description of the relation of automatically detecting and switching power supplying between a loading status and a no-load status via the drawing.

When an external loading 9 connects with the first power supply output terminator 24 and the second power supply output terminator 34 in a loading status, the first switch 22 and the second switch 32 are close. Due to the resistances 51a, 52a and 53a with high resistances and the resistance 41a are provided with low resistance, most current sequentially passes from the first power supply terminator 11, through the first node 21, the first switch 22, the second node 23, the first power output terminator 24, the external loading 9, the second power output terminator 34, the fourth node 33, the second switch 32, the third node 31 and the resistance 41a, to the second power supply terminator 12.

The current detection signal amplifier 42a can detect a current value passing through the resistance 41a, transfer the current value to a current detection signal S1 carried with the current value, and send the current detection signal S1 to the micro-controller 6. In the micro-controller 6, the current value carried by the current detection signal S1 is compared with a reference current value range provided by the reference current value database 7. Due to the current value is within the reference current value range, the micro-controller 6 can verify it as a loading status and keep the electrical load status detection and control device 100a in an original power supply situation.

When the external loading 9 is removed from the first power supply output terminator 24 and the second power supply output terminator 34, or the external loading 9 is removed from either one of the first power supply output terminator 24 and the second power supply output terminator 34, an open-circuit situation is presented between the first power supply output terminator 24 and the second power supply output terminator 34. At the same time, most current sequentially passes from the first power supply terminator 11, through the first node 21, the first switch 22, the second node 23, the fourth node 33, the second switch 32, the third node 31 and the resistance 41a, to the second power supply terminator 12.

Due to the resistance 52a are provided with high resistance, another current value passes through the resistance 41a detected by the current detection signal amplifier 42a drops down obviously. In the micro-controller 6, the current value carried by the current detection signal S1 is compared with a reference current value range provided by the reference current value database 7. Due to the current value is dropped down obviously and out of the reference current value range, the micro-controller 6 can verify it as a no-load status and send a switching signal S2 to the first switch 22 and the second switch 32. Then the first switch 22 and the second switch 32 are switched to open the first power supply circuit loop 2 and the second power supply circuit loop 3 to interrupt power supplying and enter to the no-load mode.

Hereafter, we further disclose how the first switch 22 and the second switch 32 can be switched to turn off the first power supply circuit loop 2 and the second power supply circuit loop 3 to go back to the original power supply situation.

Follow up to the no-load status with the first switch 22 and the second switch 32 switched to turn off the first power supply circuit loop 2 and the second power supply circuit loop 3 as described as above, meanwhile, most current sequentially passes from the first power supply terminator 11, through the first node 21, the resistance 51a, the second node 23, the resistance 52a, the fourth node 33, the resistance 53a, the third node 31 and the resistance 41a, to the second power supply terminator 12. Due to the voltage between first power supply terminator 11 and the second power supply terminator 12 is almost keeping in a constant, the total resistance of the current passing circuit is relatively large, the current can obviously drop down to decrease the power loss.

Due to the resistances 51a, 52a and 53a are provided with high resistance, the load voltage detection circuit 54 can detect a voltage value between the second node 23 and the fourth node 33, transfer the voltage value to a voltage detection signal S3 carried with the voltage value, and send the voltage detection signal S3 to the micro-controller 6. In the micro-controller 6, the voltage value carried by the voltage detection signal S1 is compared with a reference voltage value range provided by the reference voltage value database 8. Due to the voltage value is within the reference voltage value range, the micro-controller 6 can verify it as a no-load status and keep the electrical load status detection and control device 100a in an interrupting power supply situation.

When the external loading 9 connects the electrical load status detection and control device 100a, the equivalent resistance between the second node 23 and the fourth node 33 drops down. Thus, another voltage value between the second node 23 and the fourth node 33 detected by the current detection signal amplifier 42a drops down obviously. In the micro-controller 6, the voltage value carried by the voltage detection signal S3 is compared with the reference voltage value range provided by the reference voltage value database 8. Due to the voltage value is dropped down obviously and out of the reference voltage value range, the micro-controller 6 can verify it as a loading status and send a switching signal S2 to the first switch 22 and the second switch 32. Then the first switch 22 and the second switch 32 are switched to close the first power supply circuit loop 2 and the second power supply circuit loop 3 to go on supplying power and go back to the loading status.

The load voltage detection circuit 54 may be composed of a voltage detection signal amplifier, a voltage detection signal rectifier, and a voltage detection signal filter.

Through the load voltage detection circuit 54, the voltage between the second node 23 and the fourth node 33 can be detected and sequentially do a series of treatments of amplifying, rectifying and filtering to generate the voltage detection signal S3 sending to the micro-controller 6.

To make a summary, the device for automatically detecting and switching power supplying between a loading status and a no-load status in accordance with the present invention not only has solved the existed problems effectively but also brings novel, practicable and progressive value meeting the essence of patent to be applied for.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. An electrical load status detection and control device for detecting a current passing from a power supply with a first power supply terminal and a second power supply terminal to an electrical load, comprising:
   a first power supply circuit loop provided with a first node connected to the first power supply terminal, a second node, a first power output terminal connected to the second node;
   a first switch connected between the first node and the second node of the first power supply circuit loop;
   a second power supply circuit loop provided with a third node connected to the second power supply terminal, a fourth node, a second power output terminal connected to the fourth node;
   a no-load status detection unit connected with the third node and the second power supply terminal for detecting the current passing through the second power supply circuit loop and thereby generating a current detection signal;
   a reference current value database provided with a reference current value range; and
   a micro-controller connected with the reference current value database, the no-load status detection unit, and the first switch, which receives the current detection signal from the no-load status detection unit;
   wherein the micro-controller generates a switching signal to actuate the first switch to thereby open the first power supply circuit loop when detecting the current passing through the second power supply circuit loop out of the reference current value range of the reference current value database.

2. The device as claimed in claim 1, wherein the no-load status detection unit comprises a no-load status detection impedance connected with the third node and the second power supply terminal and a current detection circuit connected with the third node, the second power supply terminator and the micro-controller.

3. The device as claimed in claim 2, wherein the no-load status detection impedance comprises a resistance.

4. The device as claimed in claim 2, wherein the no-load status current detection circuit comprises a current detection signal amplifier.

5. The device as claimed in claim 1, further comprising a load status detection unit, and a reference voltage value database connecting with the micro-controller.

6. The device as claimed in claim 5, wherein the load status detection unit comprises:
   a first load status detection impedance connected with the first node and the second node;
   a second load status detection impedance connected with the second node and the fourth node; and
   a load voltage detection circuit connected with the second node, the fourth node and the micro-controller.

7. The device as claimed in claim 6, wherein the first load status detection impedance and the second load status detection impedance comprise resistances.

8. The device as claimed in claim 1, further comprising a second switch connected between the third node and the forth node of the second power supply circuit loop.

9. The device as claimed in claim 8, further comprising a third load status detection impedance connected between the third node and the forth node of the second power supply circuit loop.

* * * * *